(12) United States Patent
Chae et al.

(10) Patent No.: US 8,154,745 B2
(45) Date of Patent: Apr. 10, 2012

(54) METHOD AND APPARATUS TO GENERATE XHTML CONTENTS

(75) Inventors: Sung-won Chae, Suwon-si (KR); Joo-duck Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1368 days.

(21) Appl. No.: 11/716,701

(22) Filed: Mar. 12, 2007

(65) Prior Publication Data

US 2007/0279692 A1 Dec. 6, 2007

Related U.S. Application Data

(60) Provisional application No. 60/809,807, filed on Jun. 1, 2006.

(30) Foreign Application Priority Data

Jun. 29, 2006 (KR) .......................... 10-2006-0059245

(51) Int. Cl.
*G06F 15/00* (2006.01)
*G06F 17/00* (2006.01)
(52) U.S. Cl. ...................................... 358/1.15; 715/239
(58) Field of Classification Search ................. 358/1.15, 358/1.13, 1.14, 1.16, 474, 201; 455/418, 455/406, 557; 709/217, 227, 203, 237; 715/239, 715/249, 255, 835, 231
See application file for complete search history.

(56) References Cited

U.S. PATENT DOCUMENTS

2004/0253990 A1* 12/2004 McCoog et al. .............. 455/566
2007/0250591 A1* 10/2007 Milic-Frayling et al. ..... 709/217

FOREIGN PATENT DOCUMENTS

| JP | 2000-321651 | 11/2000 |
|----|-------------|---------|
| KR | 2004-38459 | 5/2004 |
| KR | 2004-50764 | 6/2004 |
| KR | 2005-15599 | 2/2005 |
| KR | 2005-19011 | 2/2005 |
| KR | 2005-105551 | 11/2005 |
| KR | 2006-56997 | 5/2006 |
| KR | 2007-69598 | 7/2007 |
| KR | 2007-102346 | 10/2007 |
| WO | WO 2004/050374 | 6/2004 |
| WO | WO 2005/020083 | 3/2005 |

OTHER PUBLICATIONS

Wright, D., et al. "XHTML-Print", Draft 0.95, Jan. 1, 2002, pp. 1-33.
PCT International Search Report issued in corresponding PCT International Application No. PCT/KR2007/002165 dated Aug. 14, 2007.
Office Action issued in corresponding Korean Patent Application No. 2006-0059245 dated May 28, 2009.

* cited by examiner

*Primary Examiner* — Saeid Ebrahimi Dehkordy
(74) *Attorney, Agent, or Firm* — Staas & Halsey LLP

(57) ABSTRACT

A method and apparatus to generate XHTML-Print data including: generating XHTML-Print extension data corresponding to an adornment image and an insertion image desired to be printed; and generating XHTML-Print printing data by adding the generated XHTML-Print extension data to XHTML-Print basic data prepared in advance.

48 Claims, 17 Drawing Sheets

FIG. 2A
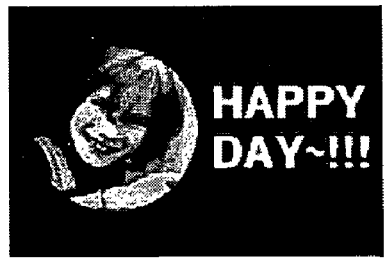
FIG. 2B
| Page Size |
|---|
| 1. 4*6 Inch (Portrait) |
| 2. 6*4 Inch (Landscape) |
| 3. A4 Portrait |
| 4. A4 Landscape |
| 5. Letter Portrait |
| 6. Letter Landscape |
FIG. 2C
210

FIG. 20
(a)
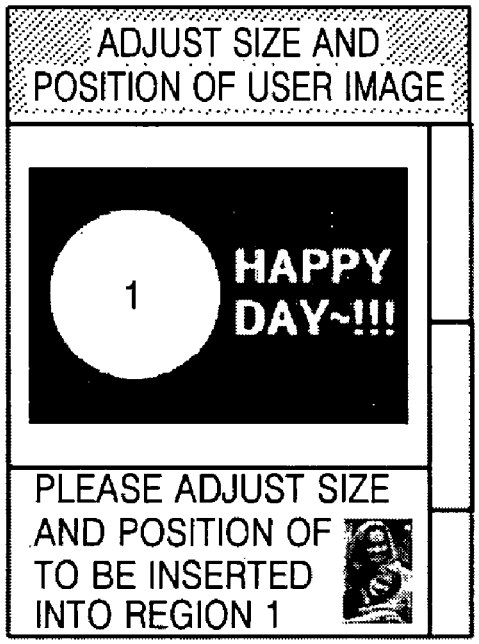
(b)
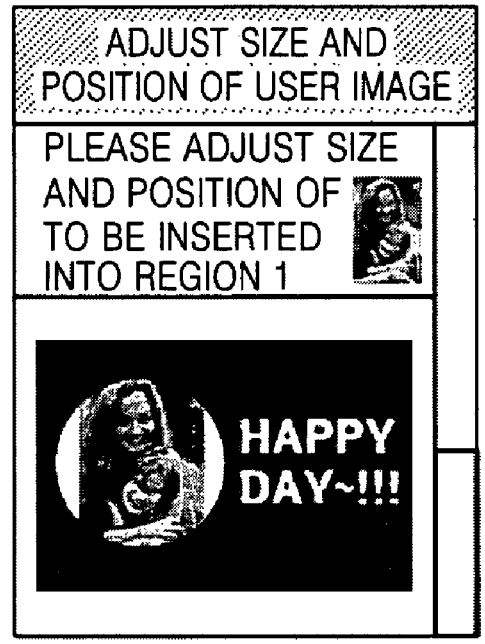
(c)
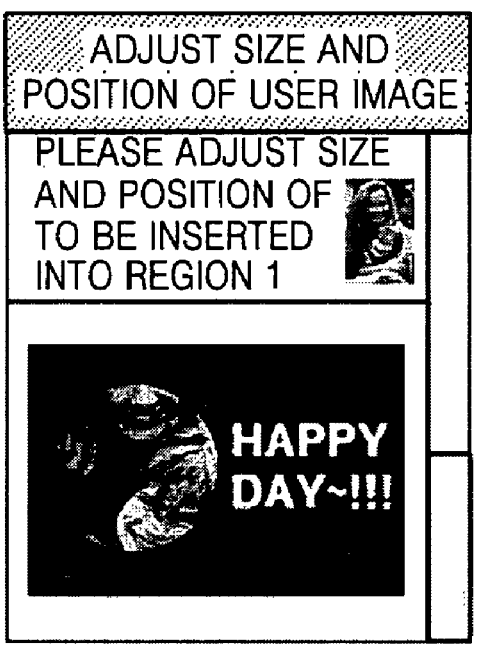
(d)
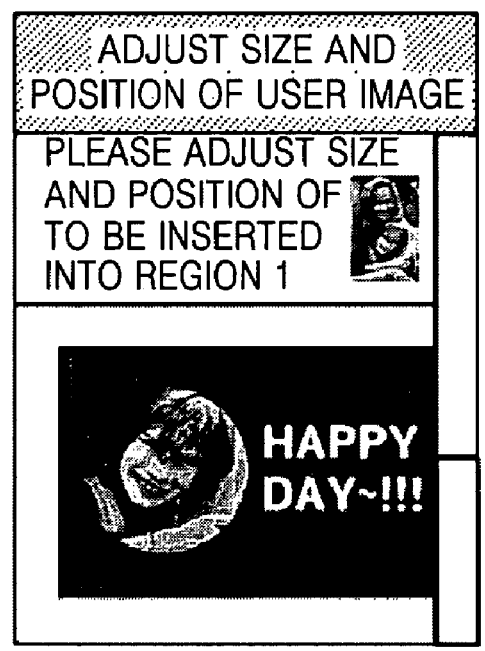

FIG. 2R

```
0. Basic contents for generating XHTML-Print content
→
<?xml version="1.0" encoding="utf-8"?>
<!DOCTYPE html PUBLIC "-//W3C//DTD XHTML-Print1.0//EN"
         "http://www.w3.org/MarkUp/DTD/xhtml-print10.dtd">
<html xmlns="http://www.w3.org/1999/xhtml">
<head>
         <style type="text/css">
         </style>
</head>
<body>
<div>
</div>
</body>
</html>
```

FIG. 2S

```
<?xml version="1.0" encoding="utf-8"?>
<!DOCTYPE html PUBLIC "-//W3C//DTD XHTML-Print 1.0//EN"
         "http://www.w3.org/MarkUp/DTD/xhtml-print10.dtd">
<html xmlns="http://www.w3.org/1999/xhtml">
<head>
    <style type="text/css">
  [1]
      [2] @page {size: 6in 4in; margin: 0in;}
          .Img1Box    (position:absolute; top:0.61in; left:0.28in; width:2.76in; height:2.76in; overflow:hidden;)
          .FrameImgBox {position:absolute; top:  0in; left:  0in;)
      [3] .Img1Size   (position:absolute; top:-2.56in; left:-0.72in; width:4.00in; height:6.00in;)
          .FrameImgSize {width:6.00in; height:4.00in;}
    </style>
</head>
<body>
<div>
  [4] <div class="Img1Box">
          <img class="Img1Size" src="I.jpg" />
      </div>
  [5] <div class="FrameImgBox">
          <img class="FrameImgSize" src="A.png" />
      </div>
</div>
</body>
</html>
```

FIG. 3B

```xml
<?xml version="1.0" encoding="utf-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
    <style type="text/css">
            @page {size: 6in 4in; margin: 0in;}
            .img1Box      {position:absolute; top:0.77in; left:0.36in; width:1.46in; height:1.40in; overflow:hidden;}
            .img2Box      {position:absolute; top:2.36in; left:0.36in; width:1.46in; height:1.40in; overflow:hidden;}
            .img3Box      {position:absolute; top:2.36in; left:   2in; width:2.24in; height:1.40in; overflow:hidden;}
            .FrameImgBox  {position:absolute; top:  0in; left:  0in;}

.img1Size     {position:absolute; top:-0.37in; left: 0.00in; width:1.46in; height:2.20in;}
            .img2Size     {position:absolute; top: 0.00in; left:-0.16in; width:   2in; height:   3in;}
            .img3Size     {position:absolute; top:-0.16in; left: 0.00in; width:2.70in; height:1.80in;}
            .FrameImgSize {width:6.00in; height:4.00in;}
    </style>
</head>
<body>
<div>
    <div class="img1Box">
        <img class="img1Size" src="baby.jpg" />
    </div>
    <div class="img2Box">
        <img class="img2Size" src="daughter.jpg" />
    </div>
    <div class="img3Box">
        <img class="img3Size" src="daughter1.jpg" />
    </div>
    <div class="FrameImgBox">
        <img class="FrameImgSize" src="UC_5_2_Frame.png" />
    </div>
</div>
</body>
</html>
```

FIG. 4B

```
<?xml version="1.0" encoding="utf-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
        <title>UC5-T3 : Single Image, Frame and Text</title>
        <style type="text/css">
                @page {size: 6in 4in; margin: 0in;}
            .img1Box      {position:absolute; top:0.48in; left:0.34in; width:2.65in; height:3.01in; overflow:hidden;}
                .FrameImgBox {position:absolute; top:   0in; left:   0in;}

.img1Size     {position:absolute; top:-0.48in; left:0.00in; width:2.65in; height:4.00in;}
                .FrameImgSize {width:6.00in; height:4.00in;}

.messageBox {position: absolute; top:13%; left:58%; width:42%; height: 66%;}
                .message    {position: relative; width:100%; height:85%; font-size:13.5pt; text-align:left;}
                .end        {position: relative; width:100%; height:15%; font-size:13.5pt; text-align:right;}
        </style>
</head>
<body>
        <div class="img1Box">
                <img class="img1Size" src="baby.jpg" />
        </div>
        <div class="FrameImgBox">
                <img class="FrameImgSize" src="UC_5_4_Frame.png" />
        </div>
        <div class="messageBox">
                <div class="message">
                        Dear my son.<br/>
                        Do you remember this picture?<br/>
                        I took this picture when you<br/>
                        were 5 years old. <br/>
                        It looks funny isn't it?<br/>
                        I love you so much and <br/>
                        take care of yourself
                </div>
                <div class="end">
                        Sincerely, Your Mom.
                </div>
        </div>
</body>
</html>
```

410

METHOD AND APPARATUS TO GENERATE XHTML CONTENTS

CROSS-REFERENCE TO RELATED APPLICATIONS

This application claims the benefit of Korean Patent Application No. 2006-59245, filed on Jun. 29, 2006, in the Korean Intellectual Property Office, and U.S. Provisional Patent Application No. 60/809,807, filed on Jun. 1, 2006, in the United States Patents and Trademarks Office, the disclosure of which are incorporated herein by reference.

BACKGROUND OF THE INVENTION

1. Field of the Invention

Aspects of the present invention relate to a method of generating markup data, and more particularly, to a method of and apparatus to generate extensible hypertext markup language (XHTML)-Print data in which a part desired by a user among insertion images is printed in a transparency region of an adornment image.

2. Description of the Related Art

In recent years, technology to print an image produced by a user using a mobile device, such as a mobile phone, through a printer positioned in a remote place has been developed. For this, a technology capable of printing contents formed with a variety of types of layouts and information items specified by a user, such as XHTML-Print data, has been introduced.

Detailed information on the XHTML-Print standard is disclosed at http://www.w3.org/TR/xhtml-print.

However, a user may want to print a plurality of images on one sheet of print media. For example, a user may want to print his/her image stored in a mobile device together with an image stored in a printer and having a colorless region therein. Accordingly, a method of generating XHTML-Print data to print a plurality of images on one sheet of print media is needed.

SUMMARY OF THE INVENTION

Aspects of the present invention provide a method of generating XHTML-Print data in which a part desired by a user among insertion images is made to be printed in a transparency region of an adornment image.

Aspects of present invention also provide an apparatus to generate XHTML-Print data in which a part desired by a user among insertion images is made to be printed in a transparency region of an adornment image.

Aspects of the present invention also provide a computer readable recording medium having embodied thereon a computer program to execute a method of generating XHTML-Print data in which a part desired by a user among insertion images is made to be printed in a transparency region of an adornment image.

According to an aspect of the present invention, there is provided a method of generating extensible hypertext markup language (XHTML)-Print data including: generating XHTML-Print extension data corresponding to an adornment image having a transparency region and an insertion image; and generating XHTML-Print printing data by adding the generated XHTML-Print extension data to XHTML-Print basic data.

According to another aspect of the present invention, there is provided an apparatus to generate XHTML-Print data including: an extension data generation unit to generate XHTML-Print extension data corresponding to an adornment image having a transparency region, and an insertion image; and a printing data generation unit to generate XHTML-Print printing data by adding the generated XHTML-Print extension data to XHTML-Print basic data.

According to another aspect of the present invention, there is provided a computer readable recording medium having embodied thereon a computer program to execute a method of generating XHTML-Print data, wherein the method includes: generating XHTML-Print extension data corresponding to an adornment image having a transparency region, and an insertion image; and generating XHTML-Print printing data by adding the generated XHTML-Print extension data to XHTML-Print basic data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B are reference diagrams to explain a method of generating XHTML-Print data according to another embodiment of the present invention;

FIGS. 4A and 4B are reference diagrams to explain a method of generating XHTML-Print data according to still another embodiment of the present invention;

DETAILED DESCRIPTION OF THE EMBODIMENTS

Figure 1:
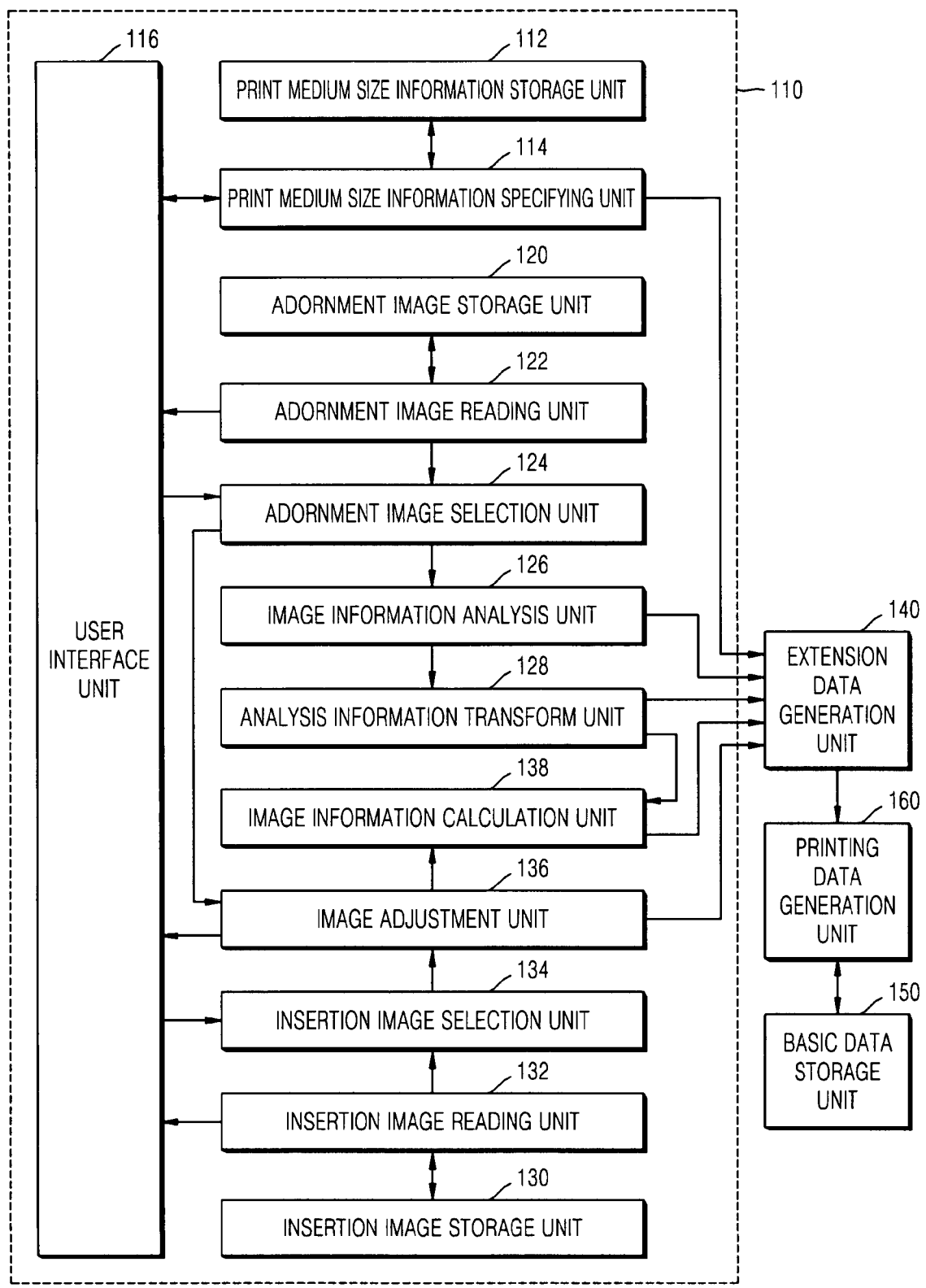
FIG. 1 is a block diagram of an apparatus to generate XHTML-Print data according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is understood that that in addition to XHTML-Print data, that is, mark-up data complying with the XHTML-Print standard, aspects of the present invention can also be applied to mark-up data complying with other standards. As described above, details of the XHMTL-Print standard are disclosed at http://www.w3.org/TR/xhtml-print.

XHTML-Print basic data, XHTML-Print extension data, XHTML-Print printing data are all XHTML-Print data and are only distinguished for convenience of description.

That is, XHTML-Print basic data is XHTML-Print data fixedly defined in advance and stored in a basic data storage unit 150, which will be described with reference to FIG. 1. XHTML-Print extension data is XHTML-Print data defined according to an adornment image and an insertion image and is generated by an extension data generation unit 140, which will be described with reference to FIG. 1. XHTML-Print printing data is XHTML-Print data generated by adding XHTML-Print extension data to XHTML-Print basic data and is generated by a printing data generation unit 160, which will be described with reference to FIG. 1.

FIG. 1 is a block diagram of an apparatus to generate XHTML-Print data according to an embodiment of the present invention, which includes a printing data setting unit 110, an extension data generation unit 140, a basic data storage unit 150, and a printing data generation unit 160.

The apparatus may be provided in a kiosk, which is a walk-up photo quality printing device designed for consumer use, but also found in retail or high traffic environments. The kiosk generally produces quality photographic prints typically using a large easy to use touch screen interface. Kiosks may have extensive forms of digital inputs (flash media, CD/DVD, bluetooth, infrared) and in addition to creating professional quality prints, kiosks are often capable of image editing and creation of archival output (CD/DVD). The kiosk may be remotely connected to a mobile device, such as a mobile phone, a digital camera and a personal digital assistant (PDA). Also, the kiosk may include an image forming apparatus, such as a laser printer and an inkjet printer. However, it is understood that aspects of the present invention are not limited to use in kiosks, and may be used with any image forming apparatus, such as a home printer.

Examples of images that can be printed by the kiosk may include an adornment image and an insertion image. The adornment image is an image in which one or more transparency regions exist. The transparency region is a region in which no color information exists. That is, a transparency region in a printed adornment image is recognized as an empty region to the naked eyes. Also, the insertion image is an arbitrary image that is desired to be inserted into a region including a transparency region. The adornment images and the insertion images may be stored and prepared in a kiosk. The kiosk may also receive insertion images transmitted from a mobile device through a wired or wireless connection.

The printing data setting unit 110 sets an adornment image and an insertion image that are desired to be printed. More specifically, the printing data setting unit 110 may set which adornment image is to be printed from among a plurality of adornment images stored in the kiosk, at what size the adornment image desired to be printed is to be printed on a print medium, which insertion image is to be printed from among a plurality of insertion images stored in the kiosk, or at what size the insertion image desired to be printed is to be printed on a print medium. It is understood that the print medium can be any of a paper, a transparency, or any tangible medium on which an image may be printed.

The printing data setting unit 110 includes a print medium size information storage unit 112, a print medium size specifying unit 114, a user interface unit 116, an adornment image storage unit 120, an adornment image reading unit 122, an adornment image selection unit 124, an image information analysis unit 126, an analysis information transform unit 128, an insertion image storage unit 130, an insertion image reading unit 132, an insertion image selection unit 134, an image adjustment unit 136, and an image information calculation unit 138.

The print medium size information storage unit 112 stores print medium size information. The print medium size information is information of one or more sizes of a sheet of print media on which XHTML-Print data may be printed.

The print medium size specifying unit 114 instructs the user interface unit 116 to display print medium size information stored in the print medium size information storage unit 112.

In this case, the user interface unit 116 displays the stored print medium size information so that a user can recognize what sizes of sheets on which XHTML-Print data is printed are available.

The user interface unit 116 may include an input function, such as a touch screen or a plurality of buttons, as well as an output function, such as a display function. Thus, if the user interface unit 116 can perform an input function, the user can specify a desired size through the user interface unit 116. Even if the user interface unit 116 does not perform an input function, the user may also specify a desired size by manipulating buttons provided on the kiosk or by inputting a print medium size remotely, such as through a mobile device.

If the user specifies a desired size in this way, the print medium size specifying unit 114 provides information on the specified size to the extension data generation unit 140 which will be described later.

The adornment image storage unit 120 stores one or more adornment images. More specifically, the adornment image storage unit 120 stores one or more files indicating one or more adornment images. Each file may be divided into a header and a body, and may be generally encrypted. The header includes information on the number of pixels forming the width of an adornment image and the number of pixels forming the height of the adornment image, and the body includes data for each pixel of the adornment image. For convenience of description, it is assumed that data of an adornment image is formed with 4 components, including transparency (A), red (R), green (G), and blue (B). However, it is understood by those skilled in the art of the present invention that the data of an adornment image may be formed with components other than A, R, G, and B.

The adornment image reading unit 122 reads the stored adornment images. More specifically, the adornment image reading unit 122 reads files stored in the adornment image storage unit 120. If the files stored in the adornment image storage unit 120 are encrypted files, the adornment image reading unit 122 decrypts the read files and may instruct the user interface unit 116 to display the adornment images indicated by the decrypted files. Accordingly, the user interface unit 116 displays the adornment images.

If the user interface unit 116 can perform an input function, the user can select a desired adornment image through the user interface unit 116. Conversely, if the user interface unit 116 does not perform an input function, the user may also select a desired adornment image by manipulating buttons provided on the kiosk. If the user selects a desired adornment image in this way, the adornment image selection unit 124 provides a file indicating the selected adornment image to the image information analysis unit 126.

The image information analysis unit 126 receives the file provided from the adornment image selection unit and recognizes the file name of the selected adornment image. The image information analysis unit 126 informs the extension data generation unit 140 of the recognized file name.

Also, the image information analysis unit 126 analyzes the information of the selected adornment image. That is, the image information analysis unit 126 analyzes the file provided from the adornment image selection unit 124. More specifically, the image information analysis unit 126 analyzes the header of the provided file and recognizes the number of pixels forming the width of the selected adornment image and the number of pixels forming the height of the selected adornment image. Also, the image information analysis unit 126 analyzes the header and the body of the provided file to calculate the number of transparency regions included in the selected adornment image, and the position and the size of each transparency region in the selected adornment image. When the image information analysis unit 126 calculates the position and the size of a transparency region, the actual position and the actual size of the transparency region are not calculated, but the actual position and the actual size of a minimum quadrilateral surrounding the transparency region (an inclusion region) are calculated. That is, the image information analysis unit 126 calculates the position and the size of the inclusion region on the selected adornment image. The position of the inclusion region is the position of a pixel on the inclusion region (for example, a pixel positioned at the left top corner of the inclusion region) on the selected adornment image. Here, the position of the inclusion region is expressed using the number of pixels. Meanwhile, the size of the inclusion region is the width and the height of the inclusion region and is also expressed using the number of pixels.

The analysis information transform unit 128 informs the extension data generation unit 140 of the specific transparency region analyzed in the image information analysis unit 126.

Also, the analysis information transform unit 128 calculates at what size each pixel forming the selected adornment image is to be printed on a print medium. That is, the analysis information transform unit 128 calculates at what lengths the width and the height of each pixel forming the selected adornment image are to be printed on the print medium. For example, if the kiosk prints the selected adornment image on a print medium without a margin, the analysis information transform unit 128 divides the width of the print medium (for example, 6 inches) by the number of pixels forming the width of the selected adornment image (for example, 1800 pixels) and thus can calculate the width of each pixel to be printed (for example, 6/1800 inches). Likewise, the analysis information transform unit 128 divides the height of the print medium (for example, 4 inches) by the number of pixels forming the height of the selected adornment image (for example, 1200 pixels) and thus can calculate the height of each pixel to be printed (for example, 4/1200 inches).

As already described above, since the position and the size of each inclusion region on the selected adornment image are expressed using the number of pixels, the analysis information transform unit 128 transforms the position and the size of each inclusion region on the selected adornment image calculated in the image information analysis unit 126 into the position and the size of each inclusion region to be printed on the print medium by using the calculated width and height of each pixel.

The analysis information transform unit 128 informs the extension data generation unit 140 of the transformed information as well.

The insertion image storage unit 130 stores one or more insertion images. More specifically, the insertion image storage unit 130 stores one or more files indicating one or more insertion images.

The insertion image reading unit 132 reads the stored insertion images.

More specifically, the insertion image reading unit 132 reads the files stored in the insertion image storage unit 130. Also, the insertion image reading unit 132 instructs the user interface unit 116 to display the read insertion images. In this case, the user interface unit 116 displays the read insertion images.

If the user interface unit 116 can perform an input function, the user can select a desired insertion image through the user interface unit 116. Conversely, if the user interface unit 116 does not perform an input function, the user may also select a desired insertion image by manipulating buttons provided on the kiosk. If the user selects a desired insertion image, the insertion image selection unit 134 provides the file indicating the selected insertion image to the image adjustment unit 136.

The image adjustment unit 136 receives the file provided from the insertion image selection unit 134 and recognizes the file name of the selected insertion image. The image adjustment unit 136 informs the extension data generation unit 140 of the recognized file name.

The image adjustment unit 136 instructs the user interface unit 116 to display both the adornment image selected in the adornment image selection unit 124 and the insertion image selected in the insertion image selection unit 134. According to the instruction, the user interface unit 116 displays both the selected adornment image and the selected insertion image.

In this case, the user can adjust the position and size of the displayed insertion image relative to the displayed adornment image. The adjustment at this time can be performed by contact-manipulating the user interface unit 116 having an input function, or by manipulating buttons provided on the kiosk. Once the adjustment is completed, the image information calculation unit 136 calculates the adjusted position and size.

The extension data generation unit 140 generates XHTML-Print extension data indicating the size specified in the print medium size specifying unit 114. In addition, the extension data generation unit 140 generates XHTML-Print extension data indicating the file name provided by the image information analysis unit 126, and XHTML-Print extension data indicating contents provided by the analysis information transform unit 128.

Also, the extension data generation unit 140 generates XHTML-Print extension data indicating the file name provided by the image adjustment unit 136, and XHTML-Print extension data indicating the results calculated by the image information calculation unit 138.

The basic data storage unit 150 stores XHTML-Print basic data that is fixedly included in XHTML-Print printing data. The XHTML-Print extension data generated in the extension data generation unit 140 can be added to the XHTML-Print basic data.

The printing data generation unit 160 reads the stored XHTML-Print basic data and generates XHTML-Print printing data by adding the generated XHTML-Print extension data to the read XHTML-Print basic data.

The kiosk includes a printer unit (not shown) which prints XHTML-Print printing data on a print medium. In this way, the printer unit (not shown) prints an image displayed on the user interface unit 116 immediately after the adjustment in the image adjustment unit 136 is finished.

FIGS. 2A through 2S are reference diagrams to explain a method of generating XHTML-Print data according to an embodiment of the present invention.

In this instance, if the user wants an adornment image having one transparency region and one insertion image to be printed together on a print medium, the user interface unit 116 displays only part of the insertion image corresponding to the transparency region and the printer unit (not shown) prints only the part of the insertion image corresponding to the transparency region.

Also, according to an embodiment of the present invention, the aspect ratio of the adornment image desired to be printed matches with the aspect ratio of the print medium and is printed on the print medium without a margin.

FIG. 2A illustrates a printing result desired by the user according to the current embodiment of the present invention. A method of generating XHTML-Print printing data according to an embodiment of the present invention will now be explained.

According to an instruction from the print medium size specifying unit 114, the user interface unit 116 displays a window to display print medium size information stored in the print medium size information storage unit 112, as illustrated in FIG. 2B. According to the window illustrated in FIG. 2B, XHTML-Print printing data may be printed on 4×6 inches (portrait) size print medium, 6×4 inches (landscape) size print medium, A4 portrait size print medium, A4 landscape size print medium, letter portrait size print medium, or letter landscape size print medium.

If the user specifies XHTML-Print printing data to be printed on 4×6 inch (portrait) size print medium without a margin, the extension data generation unit 140 generates the following XHTML-Print extension data.

```
@page {size:4in 6in; margin:0in;}
.FrameImgSize{width:4.00in; height:6.00in;}
```

.FrameImgSize corresponds to a size of the adornment image on a print medium to be printed.

Likewise, if the user specifies XHTML-Print printing data to be printed on A4 portrait size print medium without a margin, the extension data generation unit 140 generates the following XHTML-Print extension data.

```
@page {size: A4 portrait; margin:0in;}
.FrameImgSize {width:210mm; height:297mm;}
```

Here, A4 portrait size is 210 mm (width)×297 mm (height).

Similarly, if the user specifies XHTML-Print printing data to be printed on A4 landscape size print medium without a margin, the extension data generation unit 140 generates the following XHTML-Print extension data.

```
@page {size:A4 landscape; margin:0in;}
.FrameImgSize {width:297mm; height:210mm;}
```

Here, A4 landscape size is 297 mm (width)×210 mm (height).

Also, if the user specifies XHTML-Print printing data to be printed on letter portrait size print medium without a margin, the extension data generation unit 140 generates the following XHTML-Print extension data.

```
@page {size:letter portrait; margin:0in;}
.FrameImgSize {width:8.50in; height:11.00in;}
```

Here, letter landscape size is 8.50 inches (width)×11.00 inches (height).

Similarly, if the user specifies XHTML-Print printing data to be printed on letter landscape size print medium without a margin, the extension data generation unit 140 generates the following XHTML-Print extension data.

```
@page {size:letter landscape; margin:0in;}
.FrameImgSize {width:11.00in; height:8.50in;}
```

Here, letter landscape size is 11.00 inches (width)×8.50 inches (height).

As illustrated in FIG. 2B, when the user specifies XHTML-Print printing data to be printed on 6×4 inch (landscape) size print medium, the extension data generation unit 140 generates the following XHTML-Print extension data.

```
@page {size:6in 4in; margin:0in;}
.FrameImgSize {width:6.00in; height:4.00in;}
```

Figure 2D:
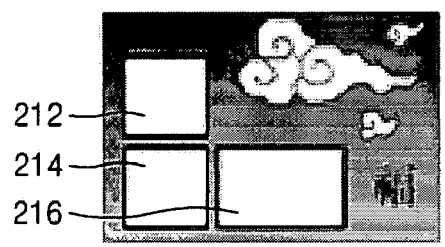
FIGS. 2A through 2S are reference diagrams to explain a method of generating XHTML-Print data according to an embodiment of the present invention.
Figure 2E:
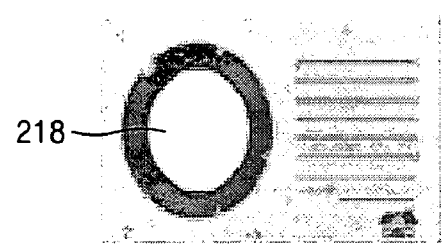

FIGS. 2C through 2E illustrate adornment images stored in the kiosk, and more particularly, in the adornment image storage unit 120. FIG. 2C illustrates an adornment image having one transparency region 210, FIG. 2D illustrates an adornment image having three transparency regions 212, 214 and 216, and FIG. 2E illustrates an adornment image having one transparency region 218. For convenience of explanation, the file name of a file indicating the adornment image illustrated in FIG. 2C is A.png, the file name of a file indicating the adornment image illustrated in FIG. 2D is B.png, and the file name of a file indicating the adornment image illustrated in FIG. 2E is C.png.

The adornment image reading unit 122 reads a file of an adornment image having the same aspect ratio as the aspect ratio (6/4) of the size (6×4 inches (landscape) size) selected by the user among the files (A.png, B.png, C.png) stored in the adornment image storage unit 120. Since the adornment images illustrated in FIGS. 2C through 2E all have the aspect ratio of 6/4, the adornment image reading unit 122 reads A.png, B.png, and C.png from the adornment image storage unit 120, and instructs the user interface unit 116 to display the read A.png, B.png, and C.png.

Figure 2F:
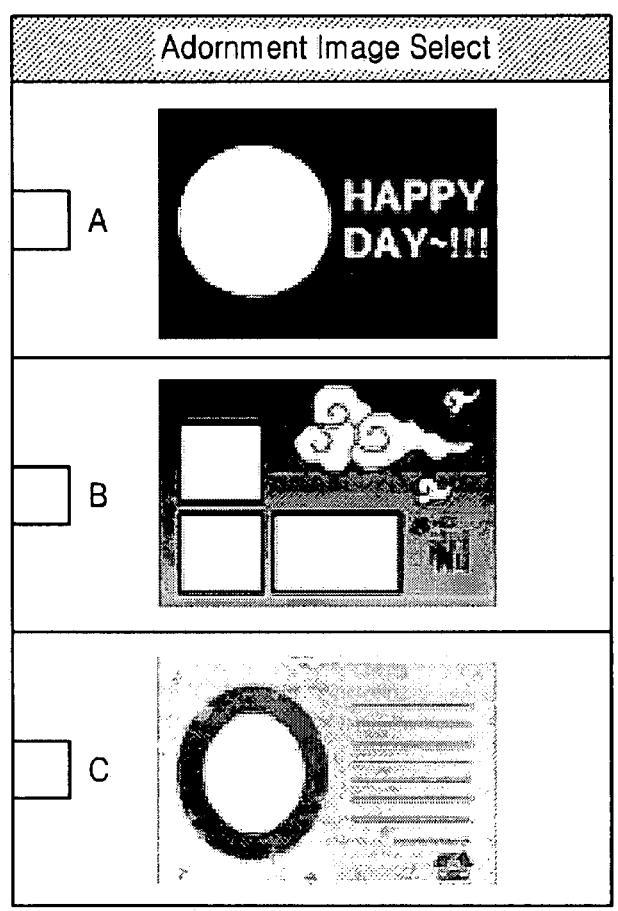

According to the instruction, the user interface unit 116 displays a window displaying the adornment images illustrated in FIGS. 2C through 2E, as illustrated in FIG. 2F. Meanwhile, if the read A.png, B.png, and C.png are all encrypted files, the adornment image reading unit 122 decrypts all the files and the user interface unit 116 displays the decrypted A.png, B.png, and C.png.

Figure 2G:
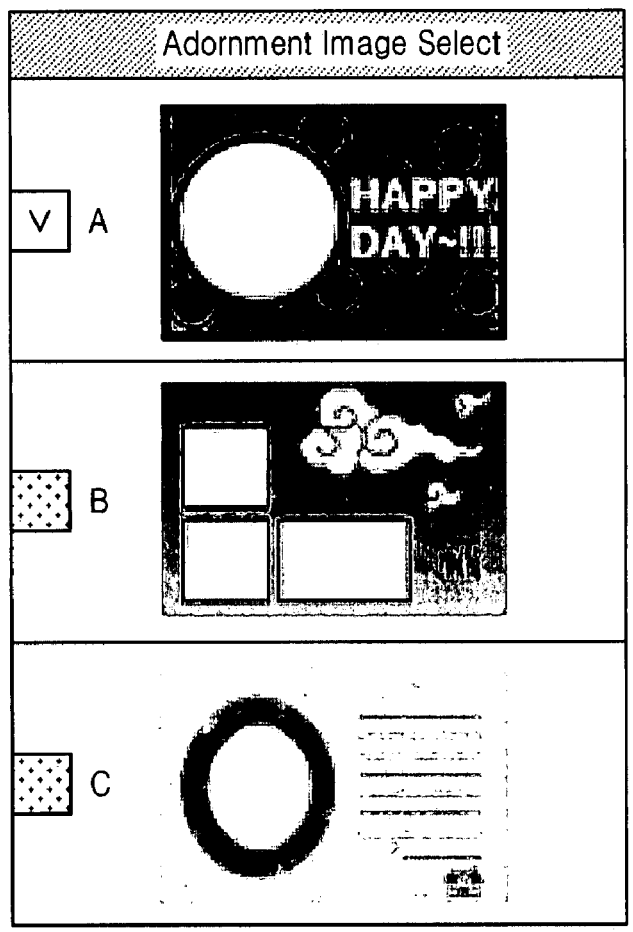

In FIG. 2G, the check mark indicates that the corresponding file is selected, and dot marks indicate that the corresponding files cannot be selected. That is, if the user selects A.png after viewing the window illustrated in FIG. 2F, the user interface unit 116 displays the window as illustrated in FIG. 2G.

In this way, if the user selects one adornment image, the adornment image selection unit 124 provides the file indicating the selected adornment image to the image information analysis unit 126, the image information analysis unit 126 recognizes the file name (A.png) of the provided file of the adornment image, and the image information analysis unit 126 informs the extension data generation unit 140 of the recognized file name. Accordingly, the extension data generation unit 140 generates the following XHTML-Print extension data.

```
<div class= "FrameImgBox">
<img class= "FrameSize" src= "A.png"/>
</div>
```

The image information analysis unit 126 analyzes the information of the adornment image selected by the user.

In the current embodiment of the present invention, the image information analysis unit 126 analyzes the information of the image indicated by A.png.

More specifically, the image information analysis unit 126 analyzes the header of A.png, and recognizes the number of pixels (1800 pixels) forming the width of the selected adornment image and the number of pixels (1200 pixels) forming the height of the selected adornment image.

Figure 2H:
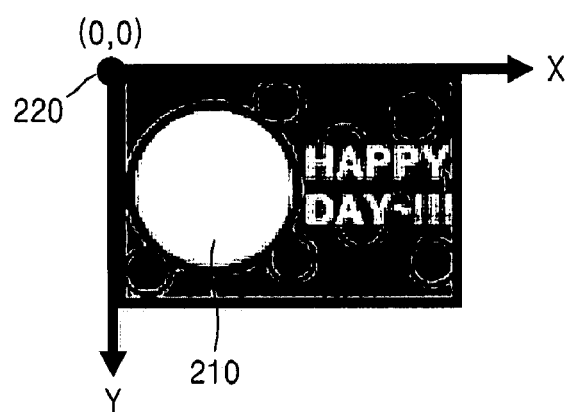

Meanwhile, each data item forming the body of A.png matches with each pixel forming the selected adornment image. Accordingly, by identifying data items indicating transparent pixels among the data items forming the body of A.png, the image information analysis unit 126 can identify the number of transparency regions existing in the selected adornment image, and the position of each pixel forming the transparency region 210. In this way, the image information analysis unit 126 calculates the number (1) of transparency regions included in the selected adornment image, and the position and the size of the transparency region 210 on the selected adornment image. At this time, the position and the size can be obtained on a coordinate plane as illustrated in FIG. 2H.

Figure 2I:
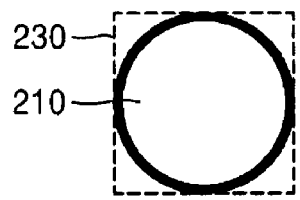

The process of calculating the position and the size of 'the transparency region 210 on the selected adornment image by the image information analysis unit 126 includes calculating the position and the size of the inclusion region 230, which is a minimum quadrilateral surrounding the transparency region 210 on the selected adornment image, as illustrated in FIG. 2I.

Figure 2J:
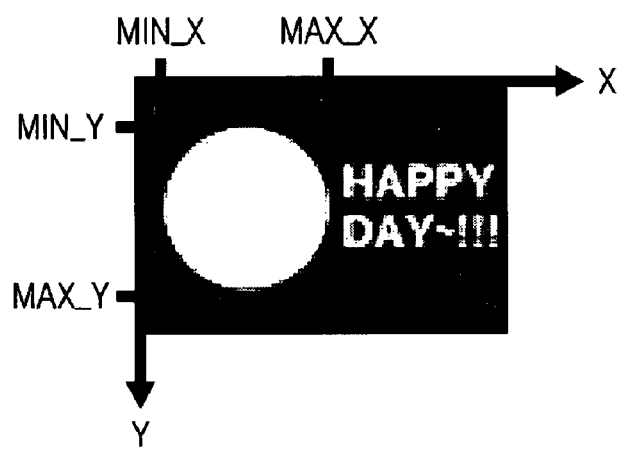
Figure 2K:
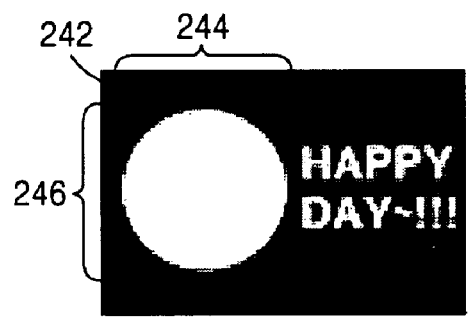

FIGS. 2J and 2K are diagrams illustrating a process in which the image information analysis unit 126 calculates the position and the size of the inclusion region 230 on the selected adornment image.

Among pixels forming the transparency region 210, the image information analysis unit 126 can identify a minimum value (MIN_X) and a maximum value (MAX_X) among X values, and a minimum value (MIN_Y) and a maximum value (MAX_Y) among Y values with respect to the origin 220. Here, each of MIN_X, MIN_Y, MAX_X, and MAX_Y can be expressed using the number of pixels. That is, each of MIN_X, MIN_Y, MAX_X, and MAX_Y indicates how many pixels exist between the point and the origin. For convenience of explanation, it is assumed that MIN_X, MIN_Y, MAX_X, and MAX_Y are 84 pixels, 183 pixels, 911 pixels, and 1010 pixels, respectively.

In this case, the image information analysis unit 126 can calculate the position and the size of the inclusion region 230. According to an aspect of the present invention, the position of the inclusion region 230 is the position of a predetermined pixel on the inclusion region 230 (for example, a pixel positioned at the top left corner 242 of the inclusion region 230). However, it is understood that other aspects of the present invention may designate another pixel in the inclusion region. Here, the position of the pixel positioned at the top left corner 242 is (X,Y)=(MIN_X, MIN_Y)=(84 pixels, 183 pixels). The width 244 of the inclusion region 230 is MAX_X−MIN_X+1=828 pixels, and the height 246 of the inclusion region 230 is MAX_Y−MIN_Y+1=828 pixels.

The analysis information transform unit 128 informs the extension data generation unit 140 of the number (1) of the transparency region analyzed in the image information analysis unit 126.

The analysis information transform unit 128 also divides the width of the print medium (6 inch), specified in the print medium size specifying unit 122, by the number of pixels (1800 pixels) forming the width of the selected adornment image, calculated in the image information analysis unit 126, to calculate the width of each pixel to be printed (for example, $6/1800$ inch). Likewise, the analysis information transform unit 128 divides the height of the print medium (4 inches) by the number of pixels (1200 pixels) forming the height of the selected adornment image to calculate the height of each pixel to be printed ($4/1200$ inches).

Accordingly, the analysis information transforms unit 128 transforms the position (84 pixels, 183 pixels) and the size (828 pixels, 828 pixels) of the inclusion region 230, analyzed in the image information analysis unit 126, into the position ($84/300$ (0.28) inches, $183/300$ (0.61) inches) and the size ($828/300$ (2.76) inches, $828/300$ (2.76) inches) of the inclusion region 230 to be printed on the print medium. The analysis information transform unit 128 informs the extension data generation unit 140 of the transformed information items.

Accordingly, the extension data generation unit 140 generates the following XHTML-Print extension data.

```
.img1Box {position:absolute; top:0.61in; left:0.28in; width:2.76in; height:2.76in; overflow:hidden;}
.FrameImgBox {position:absolute; top: 0in; left: 0in;}
```

Here, .img1Box indicates the position and the size of a first inclusion region 230 on the print medium to be printed. According to an aspect of the present invention, the position of the inclusion region 230 refers to the position (MIN_X, MIN_Y)=(0.28 inches, 0.61 inches) of the top left corner 242 of the inclusion region 230, and the size of the inclusion region 230 refers to the width (MAX_X−MIN_X+1)=(2.76 inches) of the inclusion region 230 and the height (MAX_Y−MIN_Y+1)=(2.76 inches) of the inclusion region 230. Here, 'overflow:hidden;' indicates that the part of the insertion image outside the inclusion region is not displayed. In the current embodiment of the present invention, the adornment image which is selected as desired to be printed has only one transparency region. However, if an adornment image selected as desired to be printed has N (N is an integer equal to or greater than 2) transparency regions, the extension data generation unit 140 generates corresponding XHTML-Print extension data (img1Box . . . , img2Box . . . , img3Box . . . , . . . , imgNBox . . . ). .FrameImgBox refers to a position at which the adornment image is to be printed on the print medium. According to an aspect of the present invention, the position of the adornment image to be printed corresponds to the position of the top left corner 220 of the adornment image, that is, the origin ((X, Y)=(0, 0)).

Figure 2L:
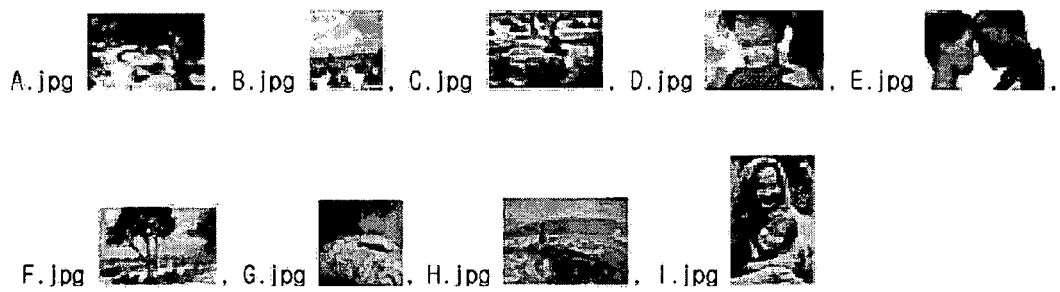

FIG. 2L illustrates insertion images stored in the kiosk, and more particularly, in the insertion image storage unit 130. A.jpg, B.jpg, . . . , I.jpg are file names of the insertion images.

Figure 2M:
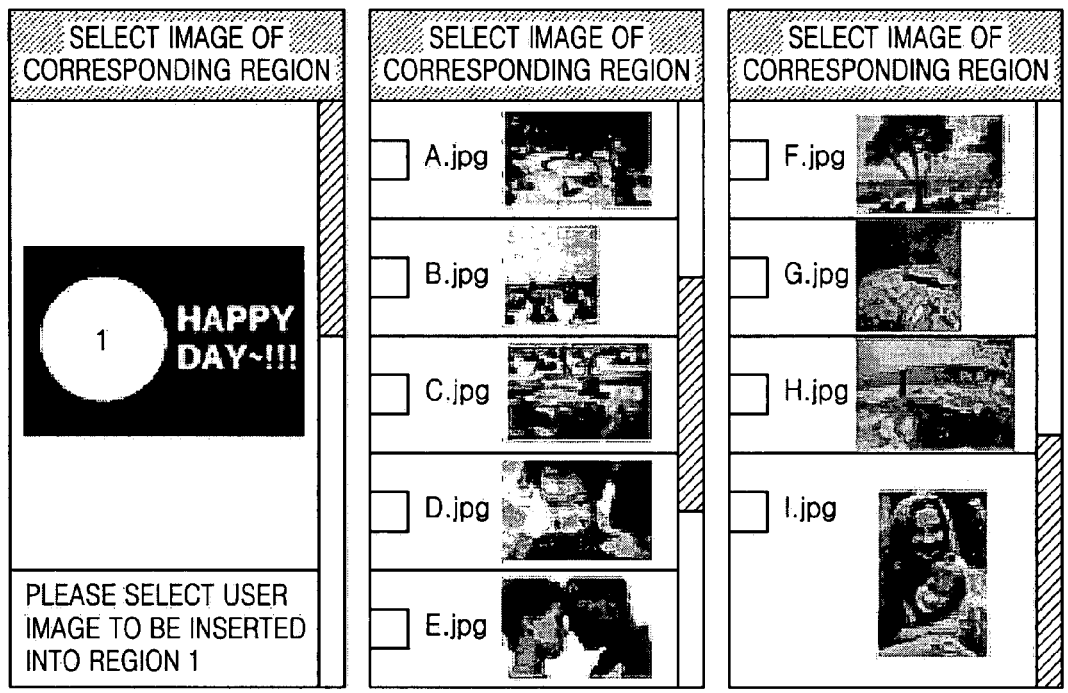

The insertion image reading unit 132 reads the files (A.jpg, B.jpg, . . . , I.jpg) stored in the insertion image storage unit 130, and instructs the user interface unit 116 to display the read A.jpg, B.jpg, . . . , I.jpg. According to the instruction, the user interface unit 116 displays a window to display the insertion images illustrated in FIG. 2L, as illustrated in FIG. 2M.

Figure 2N:
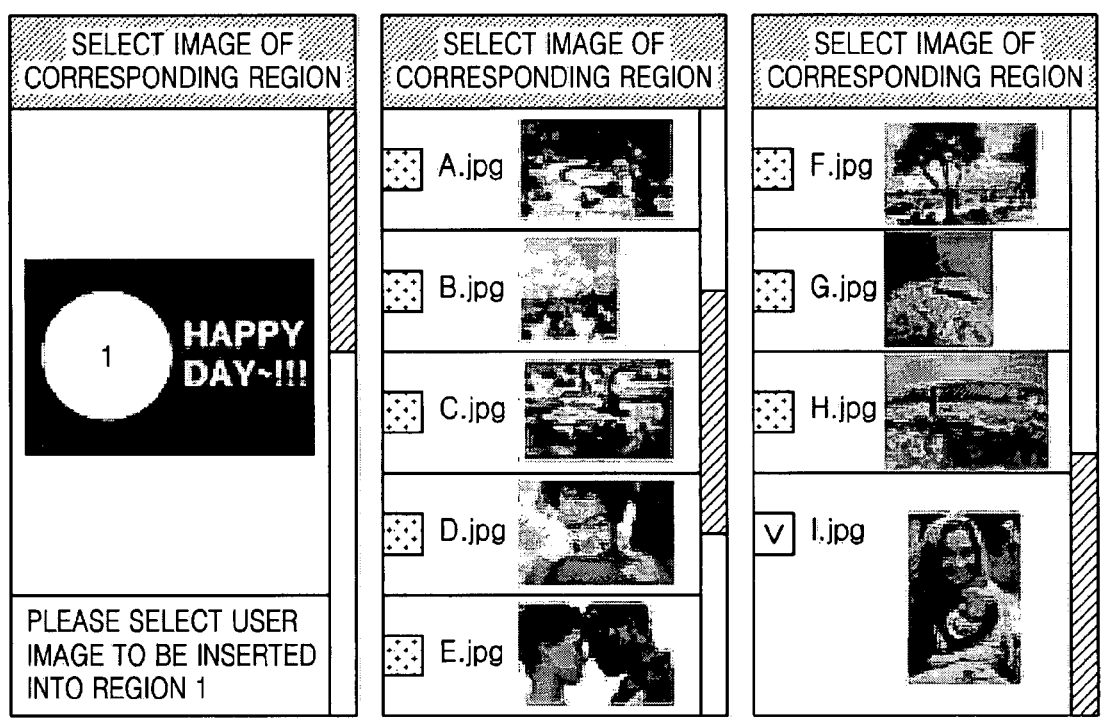

In FIG. 2N, the check mark indicates that the corresponding file is selected, and dot marks indicate that the corresponding files cannot be selected. That is, if the user selects I.jpg after viewing the window illustrated in FIG. 2M, the user interface unit 116 displays the window as illustrated in FIG. 2N.

In this way, if the user selects one insertion image, the insertion image selection unit 134 provides a file and file name (I.jpg) indicating the selected insertion image to the image adjustment unit 136. The image adjustment unit 136 recognizes the provided file name (I.jpg) of the insertion image and informs the extension data generation unit 140 of the recognized file name. The extension data generation unit 140 generates the following XHTML-Print extension data.

```
<div class= "img1Box">
<img class= "img1Size" src= "I.jpg"/>
</div>
```

Then, the image adjustment unit 136 instructs the user interface unit 116 to display both the selected adornment image and the selected insertion image. Accordingly, the user interface unit 116 displays both the selected adornment image and the selected insertion image.

In this case, the user interface unit 116 displays a window (a), as illustrated in FIG. 2O, to request the user to adjust the position and the size of the selected insertion image relative to the selected adornment image.

The user can adjust the position of the displayed insertion image relative to the displayed adornment image (b). Then, the user can adjust the size of the displayed insertion image relative to the displayed adornment image (c). Finally, the user can further adjust the position of the displayed insertion image relative to the displayed adornment image (d).

As illustrated in FIGS. 2O (b) through (d), the user interface unit 116 does not display a part of the insertion image corresponding to an outside area of the transparency region 210. Furthermore, the user interface unit 116 does not display a part of the insertion image overlapped by the adornment image. Accordingly, the insertion image desired to be printed by the user refers to the part of the insertion image after an adjustment is completed inside the transparency region 210.

Figure 2P:
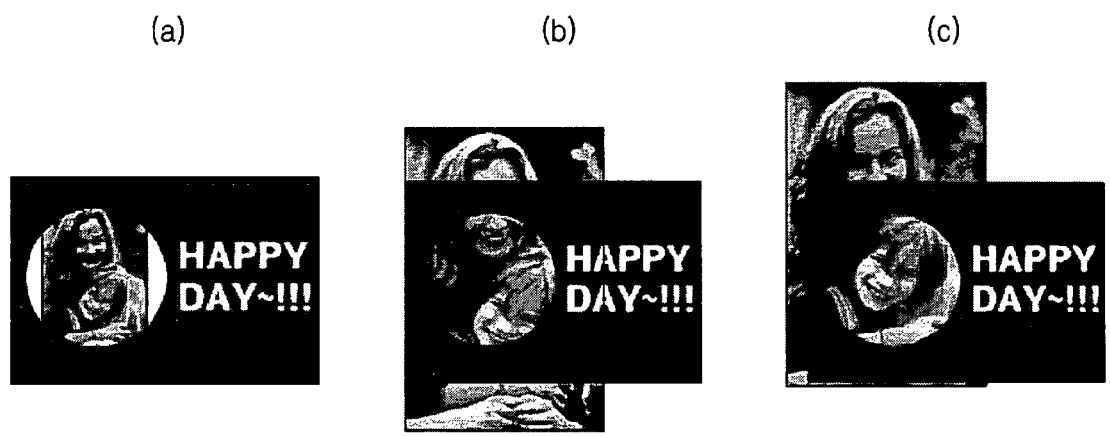

Even though the user interface unit 116 only displays the part of the insertion image corresponding to the transparency region 210, the image adjustment unit 136 recognizes that the insertion image can exist at a part other than the transparency region 210. That is, the image adjustment unit 136 recognizes what is illustrated in FIG. 2P (a) and the user interface unit 116 displays the image illustrated at the bottom of FIG. 2O (b). However, though the image adjustment unit 136 recognizes what is illustrated in FIG. 2P (b), the user interface unit 116 displays the image illustrated at the bottom of FIG. 2O (c). Likewise, though the image adjustment unit 136 recognizes what is illustrated in FIG. 2P (c), the user interface unit 116 displays the image illustrated at the bottom of FIG. 2O (d).

Figure 2Q:

Once the user finishes an adjustment of the position and the size of the selected insertion image, the image information calculation unit 136 calculates the adjusted position and the adjusted size. For convenience of explanation, it is assumed that FIG. 2O (d) illustrates an image displayed by the user interface unit 116 immediately after the adjustment is finished, and FIG. 2P (c) and FIG. 2Q illustrate an image recognized by the image adjustment unit immediately after the adjustment is finished.

First, the image information calculation unit 136 calculates the position of the adjusted insertion image relative to the selected adornment image. More specifically, according to an aspect of the present invention, the image information calculation unit 136 calculates the relative position (an offset) of the adjusted top left corner of the insertion image relative to the top left corner of the inclusion region 230. However, it is understood that other locations of the insertion image and inclusion region may be used to calculate the position of the adjusted insertion image. That is, the image information calculation unit 136 calculates $-e$ (c+d), $-h$ (f+g). Here, d and g are $^{84}/_{300}(0.28)$ inches and $^{183}/_{300}(0.61)$ inches, respectively, obtained in the analysis information transform unit 128.

Also, the image information calculation unit 136 calculates the size of the adjusted insertion image relative to the selected adornment image. More specifically, the image information calculation unit 136 can calculate a, and b, by using that "the ratio of the displayed size of the selected insertion image to the displayed size of the selected adornment image is the same as the ratio of the size of the selected insertion image to be printed to the size(6 [inch], 4 [inch]) of the selected adornment image to be printed." For convenience of explanation, it is assumed that a is 4 and b is 6.

Furthermore, the image information calculation unit 136 can also calculate c and f [by using calculated a and b. For convenience of explanation, it is assumed that c is 0.44 and f is 1.95.

In this way, the image information calculation unit 136 can calculate the offset $(-e, -h) = (-0.72$ inches, $-2.56$ inches$)$.

The image information calculation unit 136 informs the extension data generation unit 140 of the calculated position and size. Accordingly, the extension data generation unit 140 generates the following XHTML-Print extension data.

.img1Size {position:absolute; top:−2.56 in; left:−0.72 in; width:4.00 in; height:6.00 in;}

'.img1Size' indicates the position and the size of an insertion image to be printed in the first inclusion region 230. According to an aspect of the present invention, the position of the insertion image is an offset (−0.72 inches, −2.56 inches), and the size of the insertion image is (a ×b)=(4 inches×6 inches). In the current embodiment of the present invention, the number of the insertion image selected as desired to be printed is one. However, if the total number of insertion images selected as desired to be printed is N, the extension data generation unit 140 generates corresponding XHTML-Print extension data (img1Size . . . , img2Size . . . , img3Size . . . , . . . imgNSize . . . ).

FIG. 2R illustrates XHTML-Print basic data stored in the basic data storage unit 150. FIG. 2S illustrates XHTML-Print printing data that is XHTML-Print data generated by adding XHTML-Print extension data to XHTML-Print basic data.

The XHTML-Print extension data generated corresponding to the specified size (6×4 inches) of a print medium to be printed is added to XHTML-Print basic data as indicated by subscript 1, illustrated in FIG. 2S.

The XHTML-Print extension data generated corresponding to information provided by the analysis information transform unit 128 is added to XHTML-Print basic data as indicated by subscript 2 illustrated in FIG. 2S.

The XHTML-Print extension data generated corresponding to information provided by the image information calculation unit 138 is added to XHTML-Print basic data as indicated by subscript 3 illustrated in FIG. 2S.

The XHTML-Print extension data generated corresponding to the file name (I.jpg) of the insertion image selected as desired to be printed is added to XHTML-Print basic data as indicated by subscript 4 illustrated in FIG. 2S.

The XHTML-Print extension data generated corresponding to the file name (A.png) of the adornment image selected as desired to be printed is added to XHTML-Print basic data as indicated by subscript 5 illustrated in FIG. 2S.

Figure 3A:

FIGS. 3A and 3B are reference diagrams to explain a method of generating XHTML-Print data according to another embodiment of the present invention.

According to another embodiment of the present invention, the user may select one adornment image having 3 transparency regions and 3 insertion images to be printed together on a print medium. The user interface unit 116 only displays parts of the insertion images corresponding to the transparency regions, and the printer unit (not shown) only prints the parts of the insertion images corresponding to the transparency regions.

Also, the aspect ratio of the adornment image desired to be printed matches with the aspect ratio of the print medium. Furthermore, the adornment image desired to be printed may be printed without a margin on the print medium.

FIG. 3A illustrates a printing result desired by the user according to another embodiment of the present invention, and FIG. 3B illustrates XHTML-Print printing data according to another embodiment of the present invention.

According to another embodiment of the present invention, the file name of a file indicating the adornment image selected as desired to be printed is UC_5_2_Frame.png, and the file names of files indicating the insertion images selected as desired to be printed are baby.jpg, daughter.jpg, and daughter.jpg.

A method of generating XHTML-Print printing data according to another embodiment of the present invention is the same as the method described with reference to FIGS. 2A through 2S and are therefore omitted here.

Figure 4A:
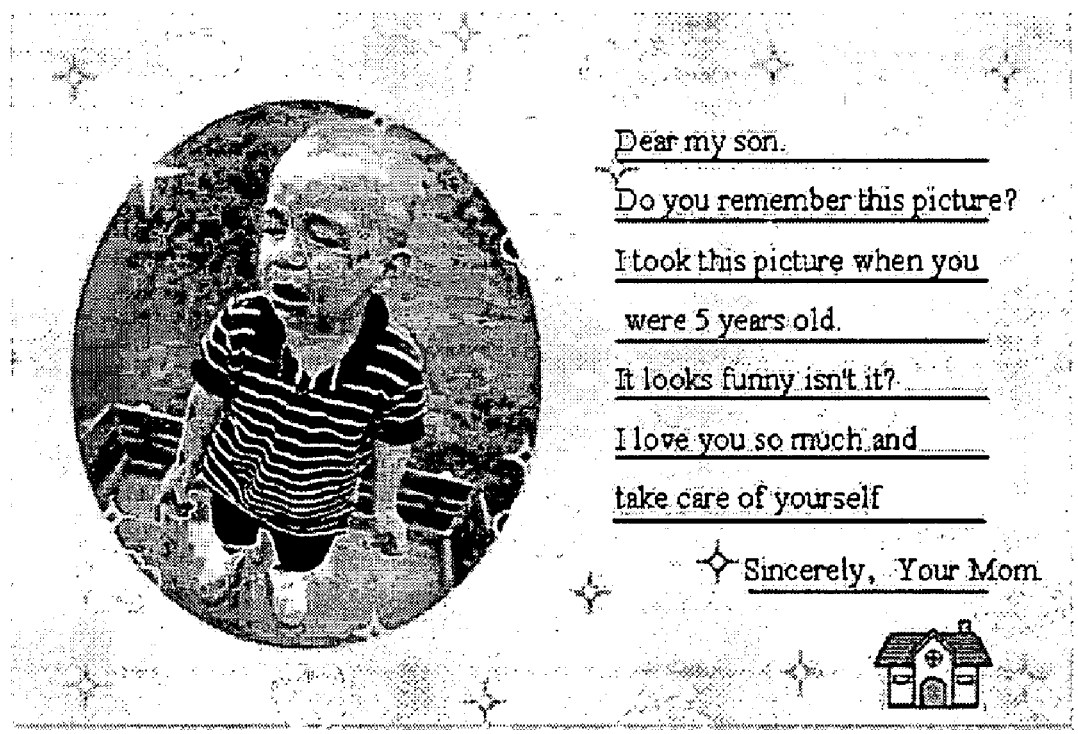

FIGS. 4A and 4B are reference diagrams to explaining a method of generating XHTML-Print data according to still another embodiment of the present invention.

According to another embodiment of the present invention, the user may select one adornment image having one transparency region and one insertion image to be printed together on a print medium. The user interface unit 116 only displays a part of the insertion image corresponding to the transparency region, and the printer unit (not shown) only prints the part of the insertion image corresponding to the transparency region.

Also, the aspect ratio of the adornment image desired to be printed matches with the aspect ratio of the print medium. Furthermore, the adornment image desired to be printed may be printed without a margin on the print medium.

FIG. 4A illustrates a printing result desired by the user according to still another embodiment of the present invention, and FIG. 4B illustrates XHTML-Print printing data according still another embodiment of the present invention.

According to still another embodiment of the present invention, the file name of a file indicating the adornment image selected as desired to be printed is UC_5_4_Frame.png, and the file name of a file indicating the insertion image selected as desired to be printed is baby.jpg.

According to still another embodiment of the present invention, the user can add any text (printing text) to the adornment image. According to an instruction from a printing text reading unit (not shown), the user interface unit 116 displays file names of printing text files stored in a printing text storage unit (not shown), and the user can select a printing text file desired to be printed.

Therefore, the printing text desired to be printed may be stored in the printing text storage unit (not shown), and the user may input the file name through the user interface unit 116 or by manipulating buttons provided on the kiosk; However, it is understood that the user may also add text to the adornment image by manipulating a keyboard on the apparatus or transmitting the text remotely through a wired or wireless connection.

For convenience of explanation, it is assumed that lines of the printing text indicated by the selected printing text file are:

"Dear my son.
Do you remember this picture?
I took this picture when you
were 5 years old.
It looks funny isn't it?
I love you so much and
take care of yourself.
Sincerely, Your Mom."

In this case, the extension data generation unit 140 generates the following XHTML-Print extension data.

```
<div class="messageBox">
<div class="message">
Dear my son.<br/>
Do you remember this picture?<br/>
I took this picture when you<br/>
were 5 years old.<br/>
It looks funny isn't it?<br/>
I love you so much and<br/>
take care of yourself.
</div>
<div class="end">
Sincerely, Your Mom.
</div>
</div>
```

The user interface unit 116 may display a window requesting the user to specify the position of the printing text on the adornment image. If the user specifies the position accordingly, the extension data generation unit 140 generates the following XHTML-Print extension data 410.

```
.messageBox {position: absolute; top:13%; left:58%;
width:42%; height:66%;}
.message {position: relative; width:100%; height:95%;
font-size:19pt; text-align:left;}
.end {position: relative; width:100%; height:5%; font-size:19pt;
text-align:right;}
```

The method of generating XHTML-Print printing data according to still another embodiment of the present invention is the same as the method described with reference to FIGS. 2A through 2S, except that, in the current embodiment, the XHTML-Print extension data is generated corresponding to the printing text as well as the adornment image and the insertion image.

FIGS. 5A through 5F are reference diagrams to explain a method of generating XHTML-Print data according to another embodiment of the present invention.

Figure 5A:
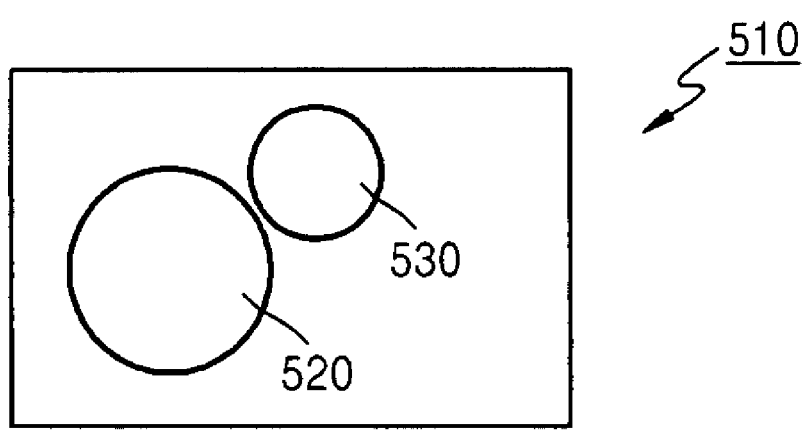
FIGS. 5A through 5F are reference diagrams to explain a method of generating XHTML-Print data according to another embodiment of the present invention.
Figure 5B:
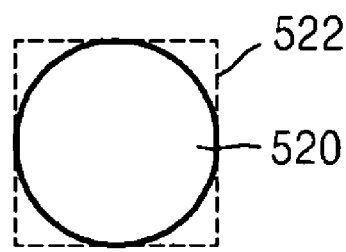
Figure 5C:
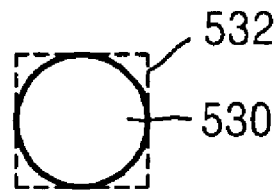
Figure 5D:
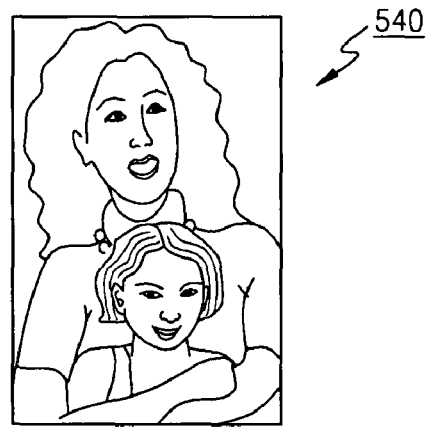
Figure 5E:
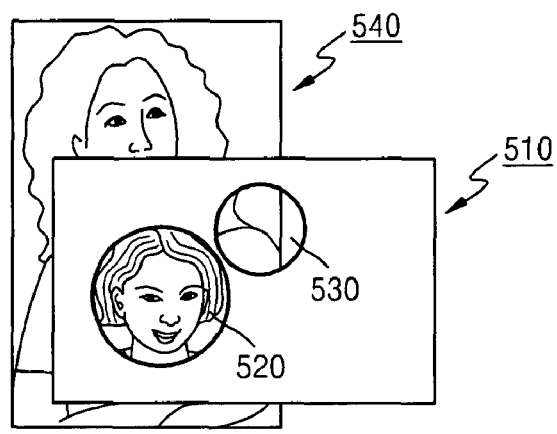
Figure 5F:
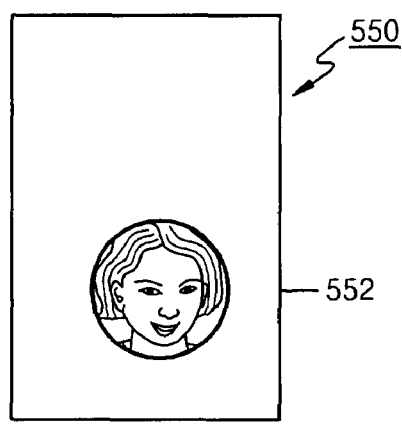

According to another embodiment of the present invention, an adornment image 510 may have two transparency regions, a first transparency region 520 and a second transparency region 530, as illustrated in FIG. 5A. A first inclusion region 522 surrounds the first transparency region 520, as illustrated in FIG. 5B, and a second inclusion region 532 surrounds the second transparency region 530, as illustrated in FIG. 5C. As illustrated in FIGS. 5A through 5C, overlapping parts exist between the first inclusion region 522 and the second inclusion region 532. More specifically, an overlapping part exists between the first inclusion region 522 and the second transparency region 530 and an overlapping part also exists between the second inclusion region 532 and the first transparency region 520.

According to another embodiment of the present invention, insertion images selected as desired to be printed are a first insertion image 540 and a second insertion image (not shown). In this case, the positions and the sizes of the first insertion image 540 and the second insertion image (not shown) relative to the adornment image 510 are adjusted by the user. According to the adjustment, the user interface unit 116 displays only the parts of the adjusted first insertion image corresponding to the first and second transparency regions 520 and 530, and displays only the parts of the adjusted second insertion image (not shown) corresponding to the first and second transparency regions 520 and 530.

Therefore, the first insertion image 540 is displayed inside both the second transparency region 530 and the first transparency region 520. Likewise, the second insertion image (not shown) is displayed inside both the second transparency region 530 and the first transparency region 520.

In order to avoid this unintended overlapping, a technological structure to print the selected adornment image and a cropping image on a print medium is provided.

More specifically, a cropping unit (not shown) of the kiosk may generate a first cropping image and a second cropping image.

Here, the first cropping image 550 is an image inside which only the adjusted first insertion image 540 corresponding to the first transparency region 520 exists. The boundary 552 of the first cropping image 550 is the same as the boundary of the adjusted first insertion image 540. The cropping unit (not shown) copies the adjusted first insertion image 540 inside the first transparency region 520, and generates a first cropping image 550 by using the copied image. The position and the size of the first cropping image 550 relative to the selected adornment image 510 are the same as the position and the size of the adjusted insertion image relative to the selected adornment image 510.

Likewise, the second cropping image (not shown) is an image inside which only the adjusted second insertion image (not shown corresponding to the second transparency region 530 exists. The boundary of the second cropping image (not shown) is the same as the boundary of the adjusted second insertion image (not shown). The cropping unit (not shown) copies the adjusted second insertion image (not shown inside the second transparency region 530, and generates the second cropping image (not shown), by using the copied image. The position and the size of the second cropping image (not shown) relative to the selected adornment image 510 are the same as the position and the size of the adjusted insertion image relative to the selected adornment image 510.

In this case, the user interface unit 116 displays the adornment image 510, a part of the first cropping image 550 corresponding to the first transparency region 520, and a part of the second cropping image (not shown) corresponding to the second transparency region 530. Also, the printer unit (not shown) prints the adornment image 510, the part of the first cropping image 550 corresponding to the first transparency region 520, and the part of the second cropping image (not shown) corresponding to the second transparency region 530 on a print medium. In this way, the first insertion image 540 cannot be printed inside the second transparency region 530 and the second insertion image (not shown) cannot be printed inside the first transparency region 520.

Figure 6:
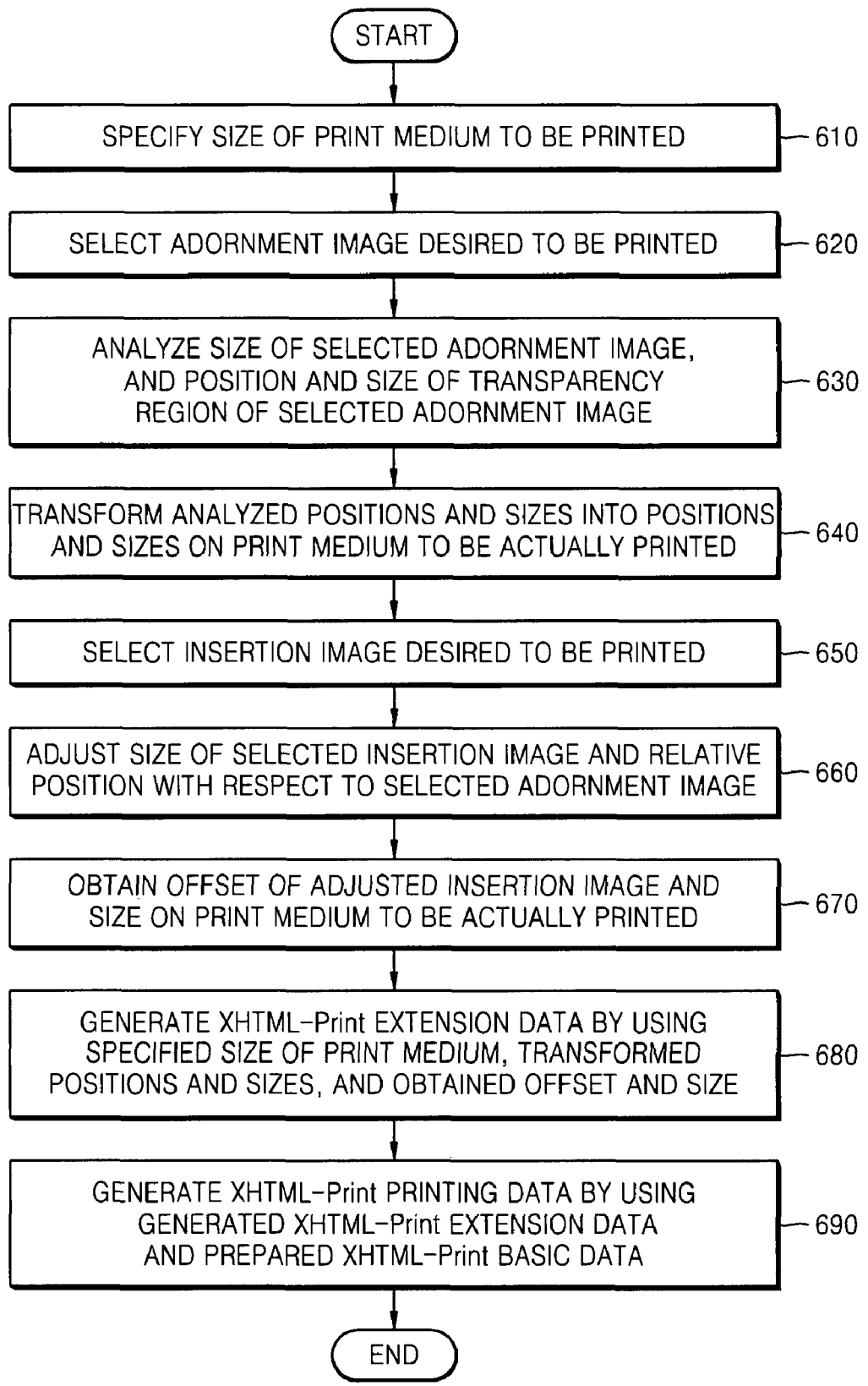
FIG. 6 is a flowchart illustrating a method of generating XHTML-Print data according to an embodiment of the present invention.

FIG. 6 is a flowchart illustrating a method of generating XHTML-Print data according to an embodiment of the present invention, and includes operations 610 through 690 to generate XHTML-Print data that allows a part of an insertion image desired to be printed by the user to be printed in a transparency region of an adornment image.

In operation 610, the size of a print medium to be printed is specified, and in operation 620, an adornment image desired to be printed is selected.

In operation 630, the number of pixels forming the width of the selected adornment image and the number of pixels forming the height of the selected adornment image are analyzed. Also, in operation 630, the position and the size of each inclusion region relative to the selected adornment image are analyzed. At this time, the position and the size are expressed by the numbers of pixels.

In operation 640, the width and the height of each pixel forming the selected adornment image are obtained and the position and the size of each inclusion region on the selected adornment image are transformed into the position and size of each inclusion region on a print medium to be printed.

In operation 650, an insertion image desired to be printed is selected.

In operation 660, both the selected insertion image and the selected adornment image are displayed and the position and the size of the selected insertion image relative to the selected adornment image are adjusted.

When the adjustment is finished 660, an offset and the size of the adjusted insertion image on a print medium to be printed are obtained in operation 670.

In operation 680, XHTML-Print extension data indicating the size specified in operation 610 is generated; XHTML-Print extension data indicating the file name of the adornment image selected in operation 620 is generated; XHTML-Print extension data indicating the result of the transforming in operation 640 is generated; XHTML-print extension data indicating the file name of the insertion image selected in operation 650 is generated; and XHTML-Print extension data indicating the results obtained in operation 670 is generated.

In operation 690, the XHTML-Print extension data generated in operation 680 is added to XHTML-Print basic data prepared in advance, so that XHTML-Print printing data is generated.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

According to the method and apparatus to generate XHTML-Print data of the present invention as described above, XHTML-Print data allowing a part of an insertion image desired to be printed by the user to be printed in a transparency region of an adornment image is generated. Accordingly, even though XHTML-Print data on all possible cases, including data on which adornment image is desired to be printed, data on how many transparency regions exist in the adornment image, data on which insertion image is desired to be printed together with the adornment image, and data on which part of the insertion image is desired to be printed, is not prepared in advance, XHTML-Print data can be automatically adaptively generated for all of the cases. Therefore, according to the present invention, the XHTML-Print data can be immediately generated and printing can be performed even when the XHTML-Print data corresponding the adornment image and insertion image desired to be printed is not prepared in advance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of generating extensible hypertext markup language (XHTML)-Print data comprising:
    obtaining positions and sizes of one or more transparency regions included in an adornment image;
    generating XHTML-Print extension data corresponding to one or more insertion images combined with the adornment image comprising one or more transparency regions by using the obtained positions and sizes of the one or more transparency regions; and
    generating XHTML-Print printing data by adding the generated XHTML-Print extension data to XHTML-Print basic data that is XHTML-Print data fixedly defined in advance;
    wherein the XHTML-Print extension data is not prepared in advance.

2. The method as claimed in claim 1, wherein the generating of the XHTML-Print extension data comprises selecting the adornment image from a plurality of adornment images.

3. The method as claimed in claim 1, wherein the generating of the XHTML-Print extension data comprises:
    obtaining a position and a size of a first inclusion region, which is a quadrilateral surrounding a first transparency region on a print medium having a specific size to be printed, and a position and a size of a first insertion image to be printed in whole or in part on the first inclusion region, on the print medium having the specific size; and
    generating the XHTML-Print extension data by using the obtained position and the size of the first inclusion region and the obtained position and the size of the first insertion image.

4. The method as claimed in claim 3, wherein the obtaining of the position and the size of the first inclusion region comprises:
    recognizing a number of pixels forming a width of the adornment image and a number of pixels forming a height of the adornment image;
    calculating a width and a height of each pixel to be printed based on the specific size of the printing medium to be printed, the number of pixels forming the width of the adornment image, and the number of pixels forming the height of the adornment image.

5. The method as claimed in claim 3, wherein the generating of the XHTML-Print extension data further comprises selecting the specific size of the print medium from a plurality of sizes.

6. The method as claimed in claim 3, wherein the generating of the XHMTL-Print extension data further comprises selecting the first insertion image from the one or more insertion images.

7. The method as claimed in claim 3, wherein the generating of the XHMTL-Print extension data further comprises using one or more file names indicating the adornment image and the first insertion image.

8. The method as claimed in claim 3, wherein the obtaining of the position and the size of the first inclusion region comprises:
    displaying the adornment image and the first insertion image;
    adjusting the position and the size of the displayed first insertion image relative to the displayed adornment image; and
    receiving a confirmation on the completion of the adjustment and obtaining the position and the size of the displayed first insertion image on the print medium.

9. The method as claimed in claim 3, wherein the generating of the XHTML-Print extension data further comprises:
    obtaining a position and a size of a second inclusion region, which is a quadrilateral surrounding a second transparency region on the print medium having the specific size to be printed, and a position and a size of a second insertion image to be printed in whole or in part on the second inclusion region, on the print medium having the specific size; and
    generating the XHTML-Print extension data by using the obtained position and the size of the second inclusion region and the obtained position and the size of the second insertion image.

10. The method as claimed in claim 9, wherein the generating of the XHMTL-Print extension data further comprises selecting the first insertion image and the second insertion image from the one or more insertion images.

11. The method as claimed in claim 9, wherein the generating of the XHTML-Print extension data further comprises selecting the specific size of the print medium from a plurality of sizes.

12. The method as claimed in claim 9, wherein the generating of the XHMTL-Print extension data further comprises using one or more file names indicating the adornment image, the first insertion image, and the second insertion image.

13. The method as claimed in claim 9, further comprising cropping the first insertion image to prevent the first insertion image from being printed on the second inclusion region and/or cropping the second insertion image to prevent the second insertion image from being printed on the first inclusion region.

14. The method as claimed in claim 1, wherein the generating of the XHTML-Print extension data comprises:
    specifying a position of a printing text to be printed on the adornment image and/or the one or more insertion images; and
    generating the XHTML-Print extension data corresponding to the adornment image combined with the printing text and the one or more insertion images.

15. An apparatus to generate XHTML-Print data comprising:
    an extension data generation unit to obtain positions and sizes of one or more transparency regions, and to generate XHTML-Print extension data corresponding to one or more insertion images combined with an adornment image comprising one or more transparency regions by usinq the obtained positions and sizes of the one or more transparency regions; and
a printing data generation unit to generate XHTML-Print printing data by adding the generated XHTML-Print extension data to XHTML-Print basic data that is XHTML-Print data fixedly defined in advance;
wherein the XHTML-Print extension data is not prepared in advance.

16. The apparatus as claimed in claim 15, further comprising an adornment image selection unit to specify the adornment image from among a plurality of adornment images.

17. The apparatus as claimed in claim 15, further comprising a user interface unit to output a display of the adornment image and the one or more insertion images and to receive inputs to control the generating of the XHTML-Print data from a user.

18. The apparatus as claimed in claim 17, further comprising:
an adornment image storage unit to store one or more adornment images;
an adornment image reading unit to instruct the user interface unit to display the one or more adornment images; and
an adornment image selection unit to specify the adornment image selected from among the plurality of adornment images by the user through the user interface unit.

19. The apparatus as claimed in claim 17, further comprising:
an insertion image storage unit to store the one or more insertion images;
an insertion image reading unit to instruct the user interface unit to display the one or more adornment images; and
an insertion image selection unit to specify an insertion image selected from among the one or more insertion images by the user through the user interface unit.

20. The apparatus as claimed in claim 15, wherein the extension data generation unit generates XHTML-Print extension data corresponding to the one or more insertion images combined with the adornment image and text inputted and/or selected by a user.

21. The apparatus as claimed in claim 15, further comprising:
an image information analysis unit to calculate a position and a size of a first inclusion region, which is a quadrilateral surrounding a first transparency region on a print medium having a specific size to be printed; and
an image information calculation unit to calculate a position and a size of a first insertion image to be printed in whole or in part on the first inclusion region, on the print medium having the specific size,
wherein the extension data generation unit generates the XHTML-Print extension data by using the calculated positions and sizes and the specific size of the print medium.

22. The apparatus as claimed in claim 21, further comprising a paper size specifying unit to specify the specific size of the print medium selected from among a plurality of sizes by a user through a user interface unit.

23. The apparatus as claimed in claim 21, wherein the extension data generation unit generates the XHMTL-Print extension data by using one or more file names indicating the adornment image and the first insertion image, the specific size, and the calculated positions and sizes.

24. The apparatus as claimed in claim 21, further comprising an image adjustment unit to adjust the position and the size of the first insertion image relative to the adornment image based on inputs by a user,
wherein the image information calculation unit calculates the adjusted position and the adjusted size of the first insertion image on the print medium having the specific size.

25. The apparatus as claimed in claim 15, further comprising:
an image information analysis unit to calculate a position and a size of a first inclusion region, which is a quadrilateral surrounding a first transparency region on a print medium having a specific size to be printed, and a position and a size of a second inclusion region, which is a quadrilateral surrounding a second transparency region on the print medium having the specific size to be printed; and
an image information calculation unit to calculate a position and a size of a first insertion image to be printed in whole or in part on the first inclusion region, on the print medium having the specific size, and a position and a size of a second insertion image to be printed in whole or in part on the second inclusion region, on the print medium having the specific size,
wherein the extension data generation unit generates the XHTML-Print extension data by using the calculated positions and sizes and the specific size of the print medium.

26. The apparatus as claimed in claim 25, further comprising a paper size specifying unit to specify the specific size of the print medium selected from among a plurality of sizes by a user through a user interface unit.

27. The apparatus as claimed in claim 25, wherein the extension data generation unit generates the XHMTL-Print extension data by using the specific size, the calculated positions and sizes, and one or more file names indicating the adornment image, the first insertion image, and the second insertion image.

28. The apparatus as claimed in claim 25, further comprising an image adjustment unit to adjust the position and the size of the first insertion image relative to the adornment image based on inputs by a user, and the position and the size of the second insertion image relative to the adornment image based on inputs by the user,
wherein the image information calculation unit calculates the adjusted position and the adjusted size of the first insertion image and the adjusted position and the adjusted size of the second insertion image on the print medium having the specific size.

29. The apparatus as claimed in claim 25, further comprising a cropping unit to crop the first insertion image to prevent the first insertion image from being printed on the second inclusion region and/or to crop the second insertion image to prevent the second insertion image from being printed on the first inclusion region.

30. A method of generating extensible hypertext markup language (XHTML)-Print data comprising:
obtaining positions and sizes of one or more transparency regions included in an adornment image; and
generating XHTML-Print extension data corresponding to one or more insertion images combined with the adornment image comprising one or more transparency regions by using the obtained positions and sizes of the one or more transparency regions,
wherein the XHTML-Print extension data is not prepared in advance.

31. The method as claimed in claim 30, further comprising:
generating XHTML-Print printing data by adding the generated XHTML-Print extension data to XHTML-Print basic data, corresponding to XHTML-Print data fixedly defined in advance.

32. The method as claimed in claim 30, wherein the generating of the XHTML-Print extension data comprises selecting the adornment image from a plurality of adornment images.

33. The method as claimed in claim 30, wherein the generating of the XHTML-Print extension data comprises:
obtaining a position and a size of a first inclusion region, which is a quadrilateral surrounding a first transparency region, of the one or more transparency regions, on a print medium having a specific size to be printed, and a position and a size of a first insertion image, of the one or more insertion images to be printed in whole or in part on the first inclusion region, on the print medium having the specific size; and
generating the XHTML-Print extension data by using the obtained position and the size of the first inclusion region and the obtained position and the size of the first insertion image.

34. The method as claimed in claim 33, wherein the obtaining of the position and the size of the first inclusion region comprises:
displaying the adornment image and the first insertion image;
adjusting the position and the size of the displayed first insertion image relative to the displayed adornment image; and
receiving a confirmation on the completion of the adjustment and obtaining the position and the size of the displayed first insertion image on the print medium.

35. The method as claimed in claim 33, wherein the generating of the XHTML-Print extension data further comprises:
obtaining a position and a size of a second inclusion region, which is a quadrilateral surrounding a second transparency region, of the one or more transparency regions, on the print medium having the specific size to be printed, and a position and a size of a second insertion image, of the one or more insertion images to be printed in whole or in part on the second inclusion region, on the print medium having the specific size; and
generating the XHTML-Print extension data by using the obtained position and the size of the second inclusion region and the obtained position and the size of the second insertion image.

36. The method as claimed in claim 35, wherein the generating of the XHMTL-Print extension data further comprises selecting the first insertion image and the second insertion image from the one or more insertion images.

37. The method as claimed in claim 35, further comprising cropping the first insertion image to prevent the first insertion image from being printed on the second inclusion region and/or cropping the second insertion image to prevent the second insertion image from being printed on the first inclusion region.

38. The method as claimed in claim 30, wherein the generating of the XHTML-Print extension data comprises:
specifying a position of a printing text to be printed on the adornment image and/or the one or more insertion images; and
generating the XHTML-Print extension data corresponding to the adornment image combined with the printing text and the one or more insertion images.

39. An apparatus to generate XHTML-Print data comprising:
an extension data generation unit to obtain positions and sizes of one or more transparency regions, and to generate XHTML-Print extension data corresponding to one or more insertion images combined with an adornment image comprising one or more transparency regions by using the obtained positions and sizes of the one or more transparency regions,
wherein the XHTML-Print extension data is not prepared in advance.

40. The apparatus as claimed in claim 39, further comprising:
a printing data generation unit to generate XHTML-Print printing data by adding the generated XHTML-Print extension data to XHTML-Print basic data, corresponding to XHTML-Print data fixedly defined in advance.

41. The apparatus as claimed in claim 39, further comprising an adornment image selection unit to specify the adornment image from among a plurality of adornment images.

42. The apparatus as claimed in claim 39, further comprising a user interface unit to output a display of the adornment image and the one or more insertion images and to receive inputs to control the generating of the XHTML-Print data from a user.

43. The apparatus as claimed in claim 39, wherein the extension data generation unit generates XHTML-Print extension data corresponding to the one or more insertion images combined with the adornment image and text inputted and/or selected by a user.

44. The apparatus as claimed in claim 39, further comprising:
an image information analysis unit to calculate a position and a size of a first inclusion region, which is a quadrilateral surrounding a first transparency region, of the one or more transparency regions, on a print medium having a specific size to be printed; and
an image information calculation unit to calculate a position and a size of a first insertion image, of the one or more insertion images to be printed in whole or in part on the first inclusion region, on the print medium having the specific size,
wherein the extension data generation unit generates the XHTML-Print extension data by using the calculated positions and sizes and the specific size of the print medium.

45. The apparatus as claimed in claim 39, further comprising:
an image information analysis unit to calculate a position and a size of a first inclusion region, which is a quadrilateral surrounding a first transparency region, of the one or more transparency regions, on a print medium having a specific size to be printed, and a position and a size of a second inclusion region, which is a quadrilateral surrounding a second transparency region, of the one or more transparency regions, on the print medium having the specific size to be printed; and
an image information calculation unit to calculate a position and a size of a first insertion image, of the one or more insertion images to be printed in whole or in part on the first inclusion region, on the print medium having the specific size, and a position and a size of a second insertion image, of the one or more insertion images to be printed in whole or in part on the second inclusion region, on the print medium having the specific size, wherein the extension data generation unit generates the XHTML-Print extension data by using the calculated positions and sizes and the specific size of the print medium.

46. The apparatus as claimed in claim 39, further comprising a cropping unit to crop the first insertion image to prevent the first insertion image from being printed on the second inclusion region and/or to crop the second insertion image to prevent the second insertion image from being printed on the first inclusion region.

47. A non-transitory computer readable recording medium encoded with the method of claim 1 implemented by a computer.

48. A non-transitory computer readable recording medium encoded with the method of claim 30 implemented by a computer.

* * * * *

UNITED STATES PATENT AND TRADEMARK OFFICE
CERTIFICATE OF CORRECTION

| | | |
|---|---|---|
| PATENT NO. | : 8,154,745 B2 | Page 1 of 1 |
| APPLICATION NO. | : 11/716701 | |
| DATED | : April 10, 2012 | |
| INVENTOR(S) | : Sung-won Chae et al. | |

It is certified that error appears in the above-identified patent and that said Letters Patent is hereby corrected as shown below:

Column 18, Line 6, In Claim 6, delete "XHMTL-print" and insert -- XHTML-print --, therefor.

Column 18, Line 10, In Claim 7, delete "XHMTL-print" and insert -- XHTML-print --, therefor.

Column 18, Line 38, In Claim 10, delete "XHMTL-print" and insert -- XHTML-print --, therefor.

Column 18, Line 46, In Claim 12, delete "XHMTL-print" and insert -- XHTML-print --, therefor.

Column 19, Line 3, In Claim 15, delete "usinq" and insert -- using --, therefor.

Column 19, Line 62, In Claim 23, delete "XHMTL-print" and insert -- XHTML-print --, therefor.

Column 20, Line 35, In Claim 27, delete "XHMTL-print" and insert -- XHTML-print --, therefor.

Column 21, Line 51, In Claim 36, delete "XHMTL-print" and insert -- XHTML-print --, therefor.

Signed and Sealed this
Nineteenth Day of June, 2012

David J. Kappos
*Director of the United States Patent and Trademark Office*